(12) United States Patent
Chen et al.

(10) Patent No.: US 9,111,151 B2
(45) Date of Patent: Aug. 18, 2015

(54) NETWORK ON CHIP PROCESSOR WITH MULTIPLE CORES AND ROUTING METHOD THEREOF

(75) Inventors: Liang-Gee Chen, Taipei (TW); Chuan-Yung Tsai, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 517 days.

(21) Appl. No.: 13/598,665

(22) Filed: Aug. 30, 2012

(65) Prior Publication Data

US 2013/0219148 A1    Aug. 22, 2013

Related U.S. Application Data

(60) Provisional application No. 61/599,951, filed on Feb. 17, 2012.

(51) Int. Cl.
*G06K 9/00* (2006.01)
*G06F 15/78* (2006.01)

(52) U.S. Cl.
CPC ........ *G06K 9/00979* (2013.01); *G06F 15/7825* (2013.01); *G06K 9/00986* (2013.01); *Y02B 60/1207* (2013.01); *Y02B 60/1225* (2013.01)

(58) Field of Classification Search
None
See application file for complete search history.

(56) References Cited

U.S. PATENT DOCUMENTS

| 5,452,231 | A  | * | 9/1995 | Butts et al. | 326/38 |
| 6,292,018 | B1 | * | 9/2001 | Kean | 326/41 |
| 6,714,552 | B1 | * | 3/2004 | Cotter | 370/406 |

* cited by examiner

*Primary Examiner* — Corey S Faherty
(74) *Attorney, Agent, or Firm* — Li & Cai Intellectual Property (USA) Office (57) ABSTRACT

An exemplary embodiment of the present disclosure illustrates a network on chip processor including multiple cores and a Kautz NoC. Each of the cores is assigned with an addressing string with L based-D words, and the addressing string does not have two neighboring identical words, wherein L present of an addressing string length is an integer larger than 1, D present of a word selection is an integer larger than 2. Each of the cores is unidirectionally link to other (D−1) cores through the Kautz NoC, and in the two connected cores, the last (L−1) words associated with the addressing string of one core are same as the first (L−1) words associated with the addressing string of the other core.

23 Claims, 7 Drawing Sheets

NETWORK ON CHIP PROCESSOR WITH MULTIPLE CORES AND ROUTING METHOD THEREOF

BACKGROUND

1. Technical Field

The present disclosure relates to a processor with multiple cores, in particular, to a network on chip (NoC) processor with multiple cores and a routing method thereof.

2. Description of Related Art

For implementing visual recongization, a neocortical computing (NC) processor is proposed. The NC processors using multiple algorithms and heterogeneous multi-core architecture to finish narrowly predefined recognition tasks have better performances than the other conventional processors.

However, for executing brain-mimicking visual recognition algorithms, several hundred Giga operations per second (GOPS) of dense and/or sparse matrix calculations are required, and an over 1.5 Tera bits per second (1.5 Tb/s) inter-stage data bandwidth is further required. In other words, the NC processor has the design challenges in computing enormous matrix operations and extremely frequent inter-stage communication.

SUMMARY

An exemplary embodiment of the present disclosure illustrates a network on chip processor including multiple cores and a Kautz NoC. Each of the cores is assigned with an addressing string with L based-D words, and the addressing string does not have two neighboring identical words, wherein L present of an addressing string length is an integer larger than 1, D present of a word selection is an integer larger than 2. Each of the cores is unidirectionally link to other (D−1) cores through the Kautz NoC, and in the two connected cores, the last (L−1) words associated with the addressing string of one core are same as the first (L−1) words associated with the addressing string of the other core.

An exemplary embodiment of the present disclosure illustrates routing method, used in the above NoC processor, wherein the routing method comprises steps of: sequentially left-shifting the addressing string of the core to find whether first n words of the left-shifted addressing string is equal to first n words of a target address in a packet, wherein n is an integer larger than or equal to 1, and the addressing string of the core and the first n words of the target address are respectively present of $\{S_1 \sim S_L\}$ and $\{D_1 \sim D_L\}$; if the first n words of the left-shifted addressing string is equal to the first n words of the target address, generating a routing string $R=\{R_1 \sim R_K\}=\{S_1 \sim S_L D_{n+1} \sim D_L\}$; if the first n words of the left-shifted addressing string is not equal to the first n words of the target address, generating the routing string $R=\{R_1 \sim R_K\}=\{S_1 \sim S_L D_1 \sim D_L\}$; and transmitting the packet to the next core with the addressing string present of $\{R_2 \sim R_{L+1}\}$.

To sum up, a NoC processor and a routing method are provided. The NoC processor has high performance, high power efficiency, and wide range of supported application.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

Exemplary embodiments of the present disclosure provide a NoC processor with multiple cores and a routing method thereof. The NoC processor comprises multiple cores and a Kautz NoC. Each of the cores is assigned with an addressing string, and the address string has L based-D words, wherein L present of an addressing string length is an integer larger than 1, and D present of a word selection is an integer larger than 2. In the addressing string, two neighboring words cannot identical to each other.

The NoC processor can have $D(D-1)^{L-1}$ cores at most, wherein each of the cores has (D−1) receiving ports to which (D−1) outputting ports of other (D−1) cores is connected through the Kautz NoC to receive packets from the (D−1) cores, and further has (D−1) outputting ports unidirectionally connected to (D−1) receiving ports of other (D−1) cores through the Kautz NoC to output packets to the (D−1) cores.

It is noted that, in the two connected cores, being named the first core and the second core (p.s. the outputting port of the first core is unidirectionally connected to the receiving core of the second core), the last (L−1) words associated with the addressing string of the first core are same as the first (L−1) words associated with the addressing string of the second core. That is, each of the cores is unidirectionally link to other (D−1) cores with the addressing strings which first (L−1) words are the same as the last (L−1) words of the addressing string of the core. Thus, by using the routing method in the NoC processor, the minimum hop count of the packet is 1, and the maximum hop count of the packet is less than or equal to L while no congestion and fault exists.

The NoC processor is a NC processor adapted for implementing visual recognition, such as image or video recognition. The cores of the NoC processor can be event-triggered and perform a hybrid multiple instruction multiple data (MIMD) execution, thus having 1.0 Tera operations per second over one Watt (1.0 TOPS/W) efficient acceleration for NC operations. Moreover, Kautz NoC in the NoC processor can be designed with fault and/or congestion avoidance, redundancy-free multicasting (i.e. the multicasting packet is identified by its address without other redundant information), and 151 Tera bits per second over one Watt (151 Tb/s/W) power efficiency. In short, the NoC processor can be used to implement a widely-applicable, low-power, and real-time intelligent visual recognition hardware.

[Exemplary Embodiment of NoC Processor]

Figure 1:
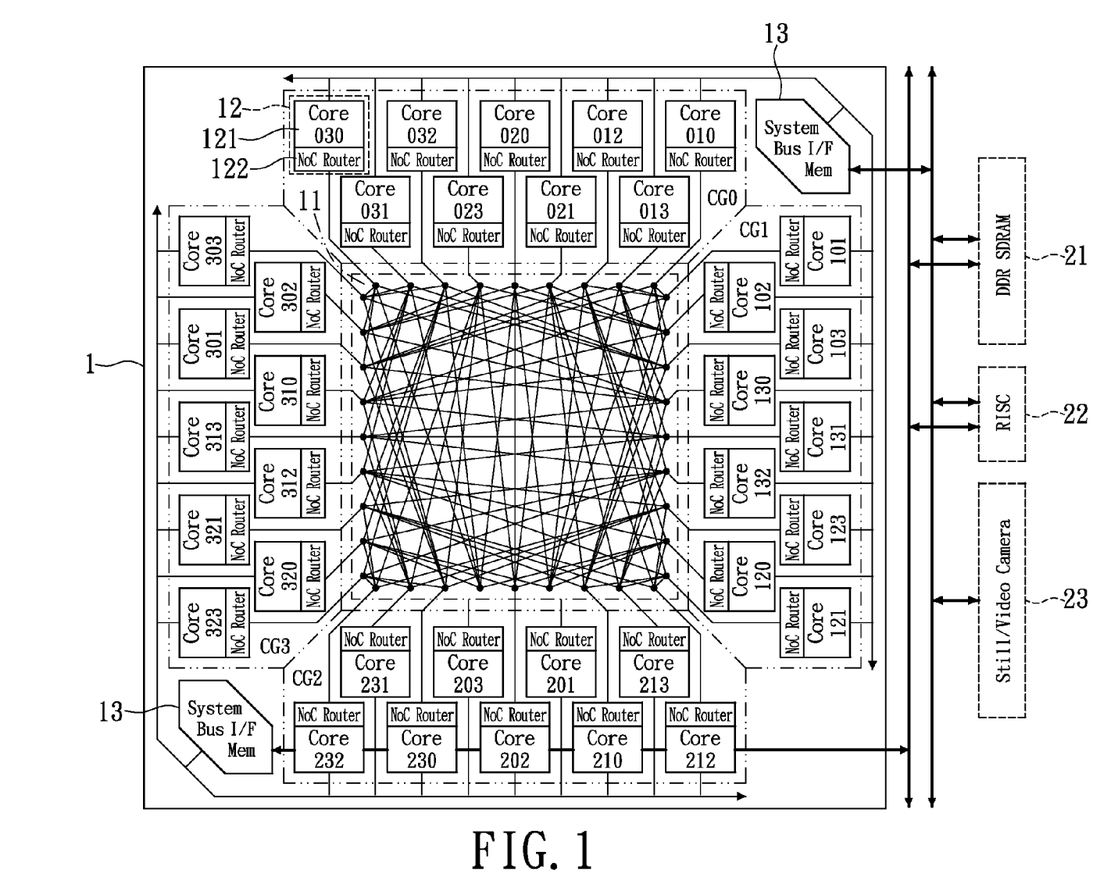
FIG. 1 is a block diagram of a NoC processor according to an exemplary embodiment of the present disclosure.

Referring to FIG. 1, FIG. 1 is a block diagram of a NoC processor according to an exemplary embodiment of the present disclosure. The NoC processor 1 comprises a Kautz NoC 11, multiple cores 12, and two system bus instruction fetch memories 13. The NoC processor 1 is connected to a double data rate synchronous dynamic random access memory (DDR SDRAM) 21, a reduced instruction set computing (RISC) 22, and a still/video camera 23 through multiple bus lines, so as to receive data from the DDR SDRAM 21 and the still/video camera 23, and instructions from the RISC 22, and store the processed data in the DDR SDRAM 21 and the still/video camera 23.

In the exemplary embodiment, D is 4, and L is 3. Thus, there are 36 cores in the NoC processor 1. The 36 cores 12 thus are respectively assigned with the 36 addressing strings present of 010, 012, 013, 021, . . . , 032, 101, 102, 103, 120, . . . , 132, 201, 202, 203, . . . , 233, 301, 302, 303, . . . , and 323. The 36 cores 12 in the exemplary embodiment are divided into four groups CG0 through CG3, wherein the group CG0 comprises the cores 12 with the addressing strings which first words are 0, and the members of the groups CG1 through CG3 can be deduced accordingly.

Each of cores 12 comprises a core unit 121 and NoC router 122. The core 12 can be designed to an event-triggered core, the core unit 121 is power on only when the first three words of a target address in the received packet are the same as the three words of the addressing string of the core 12, and the NoC router 12 is power on when the received packet is arrived. The received packet contains a control flag, the target address, an instruction, and data. Since the instruction is contained in the received packet, an instruction cache and program counter are removed from the architecture of the core 12, and the architecture of the core 12 is simplified.

The core unit 121 can be any type of intellectual property (IP), for example a processing unit IP. In one implementation, the types of IPs of the cores 12 may be identical to each other, and in another one implementation, merely some types of IPs of the cores 12 may be identical to each other. That is, the types of the IPs associated with the core units 121 in the different cores 12 are not used to limit the present disclosure.

The NoC router 12 is used to determine whether the received packet should be processed by the core unit 121 or transmitted to the other three connected cores. If the first three words of a target address in the received packet are not the same as the three words of the addressing string of the core 12, the core unit 121 is power off, and the NoC router 12 transmit the received packet to the other three connected cores 12.

If the first three words of a target address in the received packet are the same as the three words of the addressing string of the core 12, the core unit 121 is power on, the NoC router 12 decodes the received packet, and transmits the decoded data and instruction in the received packet to the core unit 121, and thus the core unit 121 can process the decoded data. Then, the processed data and instruction for the next target core 12 are transmitted to the NoC router 122, and the NoC router 122 encodes the processed data and instruction for the next target core 12 to form a new packet, and outputs the new packet to the other three connected cores. Or alternatively, the processed data are stored in the system bus instruction fetch memory 13.

External receiving ports in the NoC router 122 of the cores 12 in the groups CG0 and CG1 sharing one system bus instruction fetch memory 13 to external packets, and external receiving ports in the NoC router 122 of the other cores 12 in the groups CG2 and CG3 sharing the other one system bus instruction fetch memory 13 to receive the external packets. The system bus instruction fetch memory 13 can be a 64-bit system bus instruction fetch memory, but the present disclosure is not limited thereto.

It is noted that the number of the system bus instruction fetch memories 13 is also not used to limit the present disclosure. In another one implementation, all of the cores 12 sharing merely one system bus instruction fetch memories 13. In other one implementation, there are four system bus instruction fetch memories 13 respectively shared by the cores 12 of the groups CG0 through CG3. Generally speaking, the larger the number of the system bus instruction fetch memories 13 is, the less the waiting time of each external packet and the pins of the NoC processor 1 are.

Three receiving ports in the NoC router 122 of each of the cores 12 to which other three outputting ports in the NoC router 122 of other three cores 12 are unidirectionally connected through the Kautz NoC 11 receive packets from the other three cores 12, and three outputting ports in the NoC router 122 of each of the cores 12 which are unidirectionally connected to three receiving ports in the NoC router 122 of other three cores 12 output packets to the other three cores 12. In the two connected cores 12, being named the first core and the second core (p.s. the outputting port of the first core is unidirectionally connected to the receiving core of the second core), and the last 2 (i.e. 3-1) words associated with the addressing string of the first core 12 are same as the first 2 words associated with the addressing string of the second core 12.

For example, the outputting ports in the NoC router 122 of the cores 12 with the addressing string of 213, 013, and 313 are unidirectionally connected to the receiving ports in the NoC router 122 of the cores 12 with the addressing string of 131, and the outputting ports in the NoC router 122 of the cores 12 with the addressing string of 131 are unidirectionally connected to in the NoC router 122 the receiving ports of the cores 12 with the addressing string of 312, 313, and 310. Thus, the core 12 with the addressing string of 131 receives the three packets from the cores with the addressing string of 213, 013, and 313, and receives the external packet from the system bus instruction fetch memory 13. The core 12 with the addressing string of 131 outputs packets to the cores 12 with the addressing string of 312, 313, and 310.

The Kautz NoC 11 has multiple connection lines, wherein each of the cores 12 can be unidirectionally connected to the other three cores by using the connection lines. The Kautz NoC 11 can be implemented by a field programmable gate array (FPGA) or application-specific integrated circuit (ASIC). After the addressing strings are assigned to cores 12, the designer can using the cad tool or hardware code (such as Verilog or VHDL) to design the connection lines of the Kautz NoC 11. The Kautz NoC 11 can be operated over 2.3 Tb/s for example. Moreover, the Kautz NoC 11 may have multiple layers, and the connection lines are layout on the different layers. It is noted that the implementation, the layer number, and the operation speed of the Kautz NoC 11 are not used to limit the present disclosure.

[Exemplary Embodiment of Core]

Figure 2:
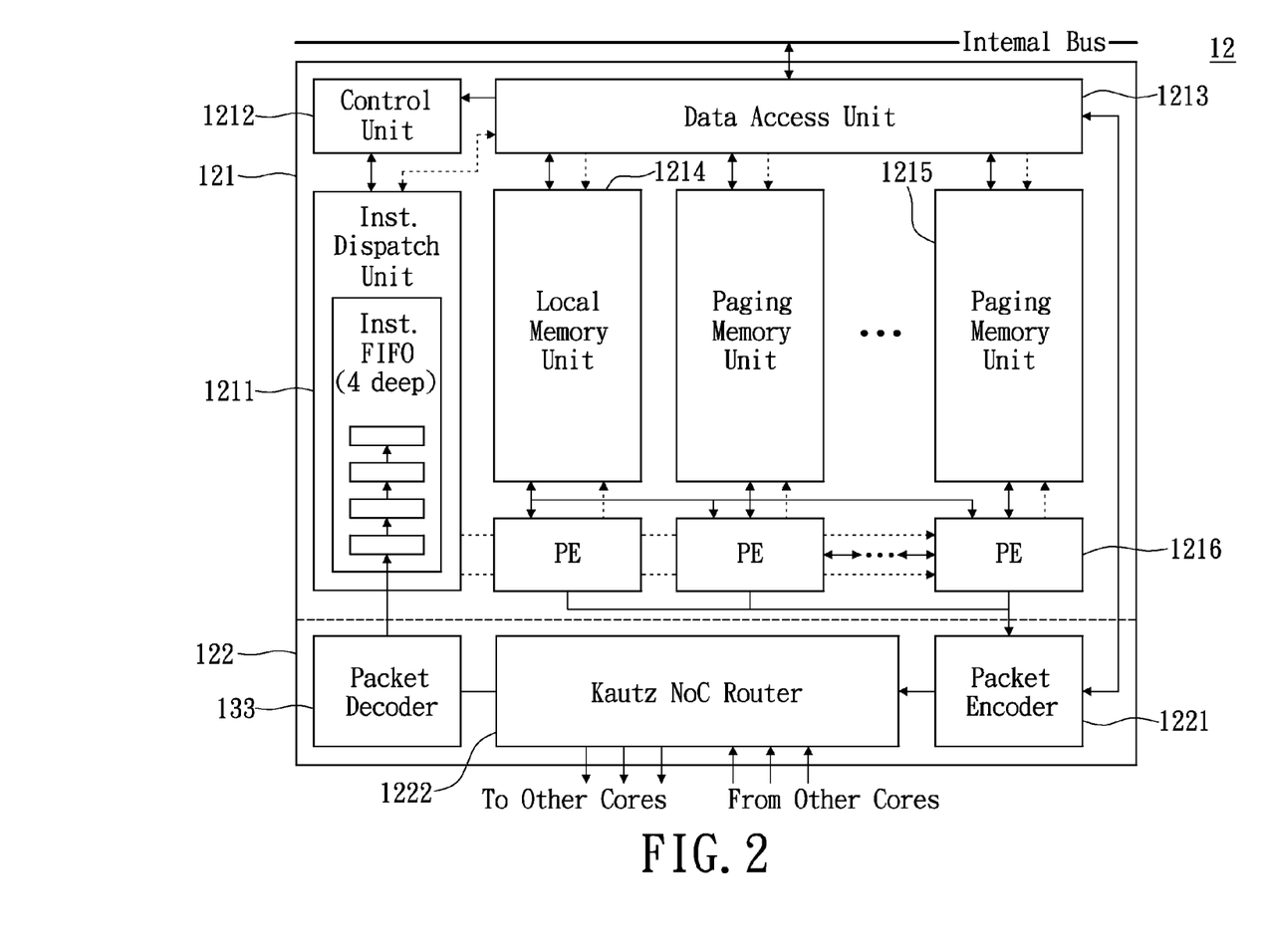
FIG. 2 is a block diagram of a core according to an exemplary embodiment of the present disclosure.

Referring to FIG. 2, FIG. 2 is a block diagram of a core according to an exemplary embodiment of the present disclosure. The core 12 comprises the core unit 121 and the NoC router 122. The core unit 121 in the exemplary embodiment is a processing unit IP, and comprises an instruction dispatch 1211, a control unit 1212, a data access unit 1213, a local memory unit 1214, multiple paging memory units 1215, and multiple processing elements (PEs). The NoC router 122 comprises a packet encoder 1221, a Kautz NoC router 1222, and a packet decoder 1223.

The instruction dispatch unit 121 is used to receive and store the decoded packet, and comprises a 4-deep instruction first-input-first-output (FIFO) for example, such that the instruction in the decoded packet is transmitted to one of the PEs 1216. The control unit 1212 controls the instruction dispatch unit 121 and data access unit 1213 to respectively dispatch the instruction to one of the PEs 1216 and access data in the system bus instruction fetch memory.

The data access unit 1213 can be direct memory access (DMA), a memory management unit (MMU), and/or a translation lookaside buffer (TLB). The data access point 1213 may be further communicated with the data access unit 1213. The data accessed by the data access unit 1213 and/or processed by the PEs 1216 can be stored in the local memory unit 1214 and/or the paging memory units 1215.

The packet encoder 1221 is used to encode the processed data and instruction for the next target core to form a new packet. The Kautz NoC router 1222 is used to determine whether the received packet should be processed by the core unit 121 or transmitted to the other three connected cores. If the first three words of a target address in the received packet are not the same as the three words of the addressing string of the core 12, the core unit 121 is power off, and the NoC router 122 transmit the received packet to the other three connected cores 12. If the first three words of a target address in the received packet are the same as the three words of the addressing string of the core 12, the Kautz NoC router 1222 transmit the receive packet to the packet decoder 1223, and the packet decoder 1223 decodes the received packet.

In the exemplary embodiment, the core 12 can be aimed to achieve low-power event-triggered execution. Thus, each of the components in the core 12 is power on only when the packet arrives to the component, and otherwise is clock-gated. Furthermore, since the instruction is contained in the received packet and transmitted to the core 12 when the received packet 12 arrived, the instruction cache and the program counter are therefore removed, and the architecture of the core 12 is simplified.

When the core unit 121 operates in the single instruction single data (SISD) mode, one of PE 1216 performs the single instruction, and one of the local memory unit 1214 and the paging memory units 1215 is used to provide the data processed by the PE 1216. When the core unit 121 operates in the single instruction multiple data (SIMD) mode, all of the PEs 1216 performs the same instruction, and data processed by the PEs 1216 are provided from the different memory units 1214 and 1215 (including the local memory unit 1214 and the paging memory units 1215).

It is noted, the core unit 121 can be designed to perform the hybrid MIMD execution. When the core unit 121 operates in the hybrid MIMD mode, at least one of the PEs 1216 and at least one memory units 1214 and 1215 perform the SISD execution, and/or at least two of the PEs 1216 and at least two memory units 1214 and 1215 perform the SIMD execution. In other words, the PEs 1216 and memory units 1214 and 1215 are divided to several groups, wherein at least one group performs the SIMD execution, and/or at least another one group performs the SISD execution.

[Exemplary Embodiment of Packet]

Figure 3:
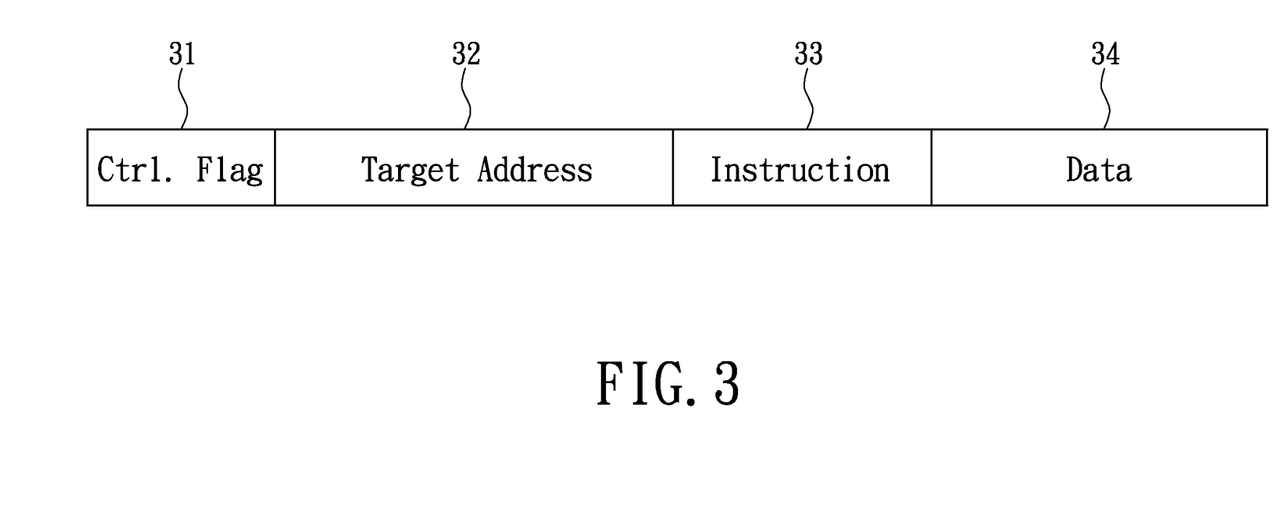
FIG. 3 is a schematic diagram of a packet according to an exemplary embodiment of the present disclosure.

Referring to FIG. 3, FIG. 3 is a schematic diagram of a packet according to an exemplary embodiment of the present disclosure. In FIG. 3, the packet 3 contains a control flag 31, a target address 32, an instruction 33, and data 34. The packet 3 totally has 80 bits, wherein the control flag 31, the target address 32, the instruction 33, and the data 34 respectively have 4 bits, 32 bits, 16 bits, and 32 bits.

It is noted that, the control flag 31 is present of the priority of the packet. The first 6 bits of the target address 32 can be used to be present of the addressing string of the target core, and the other 26 bits are adapted for addressing the data or instruction in the system bus instruction fetch memory. The format of the packet 3 is not used to limit the present disclosure, and the format of the packet 3 may be modified according the practical requirements or for meet some specification.

[Exemplary Embodiment of Kautz NoC]

Figure 4:
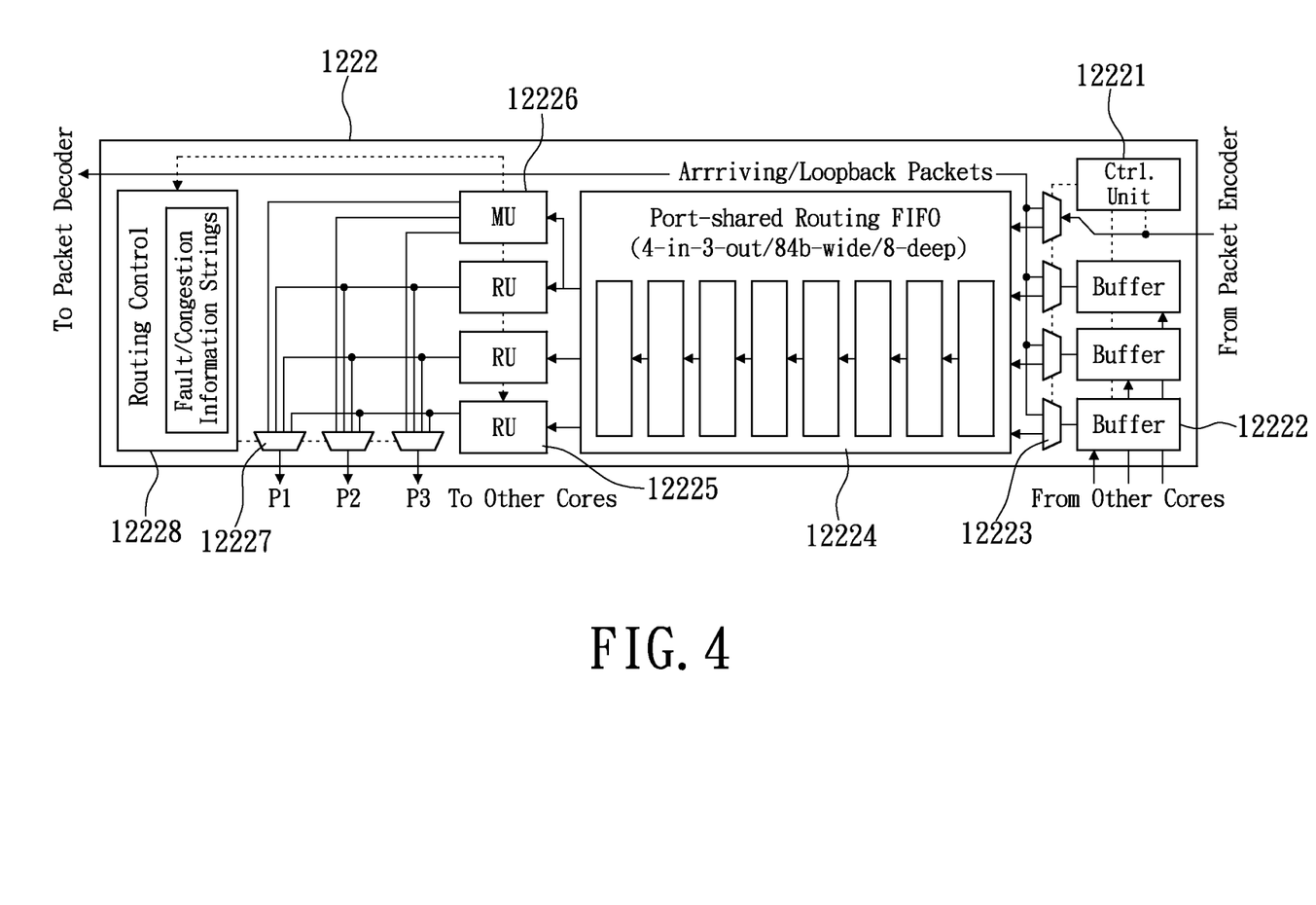
FIG. 4 is a block diagram of a Kautz NoC router according to an exemplary embodiment of the present disclosure.

Referring to FIG. 4, FIG. 4 is a block diagram of a Kautz NoC router according to an exemplary embodiment of the present disclosure. The Kautz NoC router 1222 comprises a control unit 12221, three buffers 12222, four de-multiplexors 12223, a port-shared routing FIFO 12224, three routing units (RUs) 12225, a multicasting unit (MU) 1226, three multiplexors 12227, and a routing control unit 12228.

The control unit 12221 communicates with the buffers 1222 and the de-multiplexors 12223, so to control the one of de-multiplexors 12223 to output one of the packets in the buffers and the external packet to the port-shared routing FIFO 12224.

The port the port-shared routing FIFO 12224 is used to buffer the received packet, and output one of the stored packets to one of the RUs 1225 and the MU 12226 once. The port-shared routing FIFO 12224 is a 4-in-3-out 84-bit wide and 8-deep FIFO, which is a low-power and area-efficient architecture. That is all of the de-multiplexors 12223 shares the port-shared routing FIFO 12224, and thus the Kautz NoC 1222 performs low-radix distributed routing.

The MU 12226 buffers the packet which is multicasting to three connected cores, and the RUs 12225 buffers the packets with the different priorities. For example, the priority of packet in the topper RU 1225 may be highest. The MU 12226 and RUs 12225 can transmit their received packets to the three multiplexors 12227. Each of the multiplexors 12227 receives the packets from the MU 12226 and RUs 12225, and transmits the selected packet to the connected core. The routing control unit 12228 controls the multiplexors 12227 to select their received packets to perform the packet routing. When the multiplexors 12227 select the packet from the MU 12226, the packet is multicasting to the three connected cores.

It is noted that, the MU 12226 can be removed, if the redundancy-free multicasting function is not needed. The routing control unit 12228 can record fault and/or congestion information strings to prevent the packet from routing to the fault or congested core. Thus, the packet is routed to the target core with the minimum hop count overhead. Based upon the architecture of the Kautz NoC 1222 in FIG. 4, the routing control unit 12228 can achieve quality of service (QoS), and further has fault and/or congestion avoidance.

[Exemplary Embodiment of Routing Method]

Figure 5:
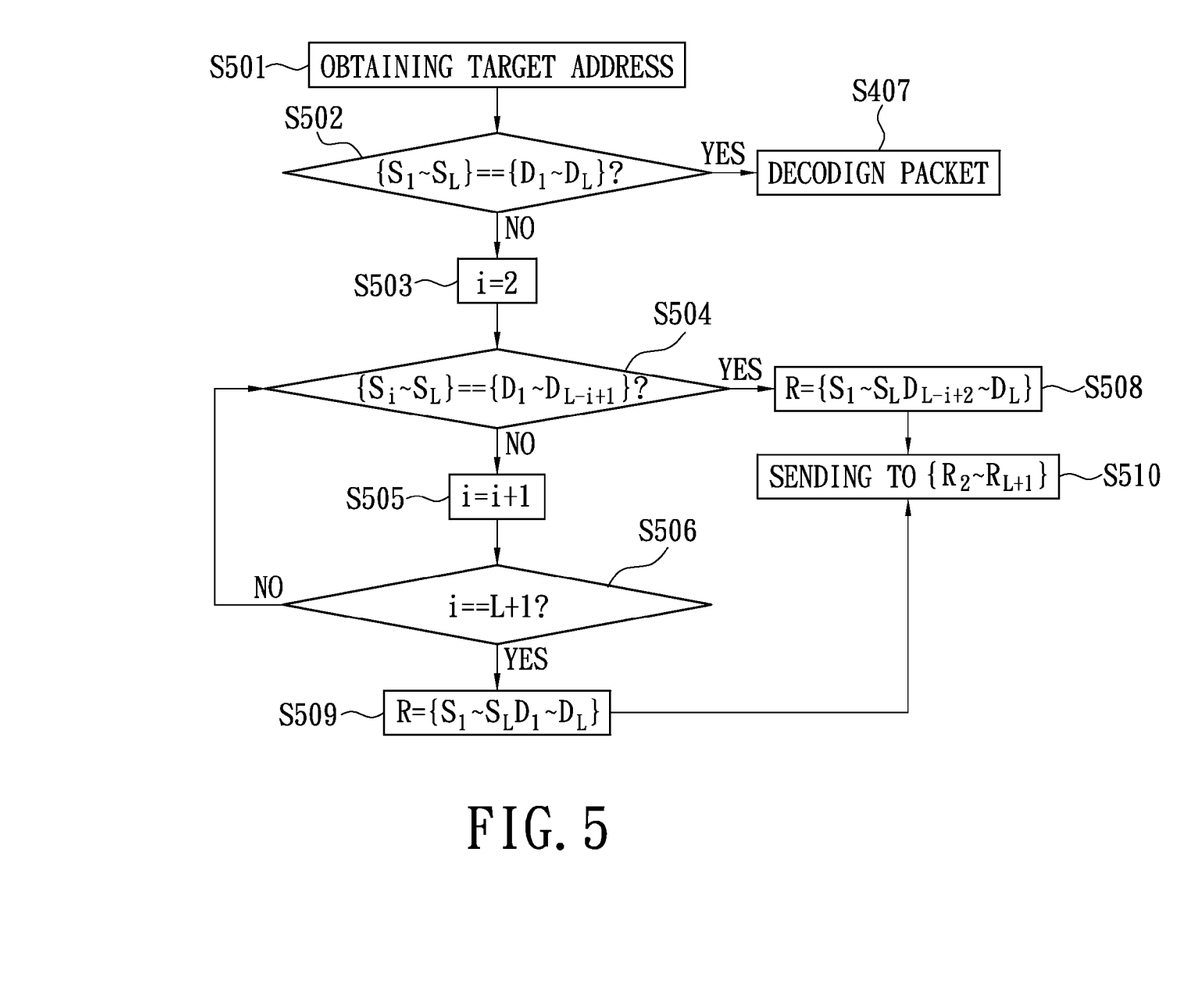
FIG. 5 is a flow chart of a routing method used in a NoC processor according to an exemplary embodiment of the present disclosure.

Referring to FIG. 5, FIG. 5 is a flow chart of a routing method used in a NoC processor according to an exemplary embodiment of the present disclosure. The routing method is executed in the NoC router to route the packet to the next core. The routing method firstly generates the routing string according to the first L words of the target address and the addressing string of the core, and then route the packet to the next core according to the routing string. The first L words of the target address is expressed as $D=\{D_1 \sim D_L\}$, the addressing string of the core is expressed as $S=\{S_1 \sim S_L\}$, and the routing string is expressed as $R=\{R_1 \sim R_K\}$, wherein K is an integer larger than (L+1) and less than (2L+1).

The generation of the routing string is illustrated as follows. The addressing string of the core is sequentially left-shifted to find whether the first n words of the left-shifted addressing string is equal to the first n words of the target address, wherein n is an integer larger than or equal to 1. If the first n words of the left-shifted addressing string is equal to the first n words of the target address, the routing string $R=\{S_1 \sim S_L D_{n+1} \sim D_L\}$. If the first n words of the left-shifted addressing string is not equal to the first n words of the target address, the routing string is $R=\{S_1 \sim S_L D_1 \sim D_L\}$. The details of the routing method are stated as follows, but it is noted that the present disclosure is not limited thereto.

At step S501, the NoC router obtains the target address of the packet, wherein the first L words of the target address, i.e. $D=\{D_1 \sim D_L\}$. Then, at step S502, the NoC router checks whether the first L words of the target address is equal to the addressing string of the core, i.e. $\{S_1 \sim S_L\}==\{D_1 \sim D_L\}$. If $\{S_1 \sim S_L\}==\{D_1 \sim D_L\}$ is true, step S507 is executed. At step S507, the NoC router decodes the packet and transmits the decoded packet to the core unit. If $\{S_1 \sim S_L\}==\{D_1 \sim D_L\}$ is false, step S503 is executed.

At step S503, the NoC router initializes an index number i to be 2. At step S504, the NoC router checks whether the last (L−i+1) words of the addressing string is equal to the first (L−i+1) words of the target address, i.e. $\{S_i \sim S_L\}==\{D_1 \sim D_{L-i+1}\}$. If $\{S_i \sim S_L\}==\{D_1 \sim D_{L-i+1}\}$ is true, step S508 is executed. If $\{S_i \sim S_L\}==\{D_1 \sim D_{L-i+1}\}$ is false, step S505 is executed.

At step S505, the NoC router adds the index number i with one, i.e. i=i+1. At step S506, the NoC router checks whether the index number i is larger than L, i.e. i==(L+1). If i==(L+1) is true, step S509 is executed. If i==(L+1) is false, step S504 is executed. At step S408, the NoC router generates the routing string $R=\{S_1 \sim S_L D_{L-i+2} \sim D_L\}$. At step S509, the NoC router generates the routing string $R=\{S_1 \sim S_L D_1 \sim D_L\}$. At step S510, the NoC router route the packet to the next core with the addressing string of $\{R_2 \sim R_{L+1}\}$.

For example, assuming L=3 and D=4, when the core with the addressing string of 010 receives a packet having the target address with the first three words 212, the generated routing string is 101212, and the packet is transmitted to the next core with the addressing string of 012. When the core with the addressing string of 213 receives a packet having the target address with the first three words 132, the generated routing string is 2132, and the packet is transmitted to the next core with the addressing string of 132.

[Exemplary Embodiment of Routing Method with Fault and/or Congestion Avoidance]

Figure 6:
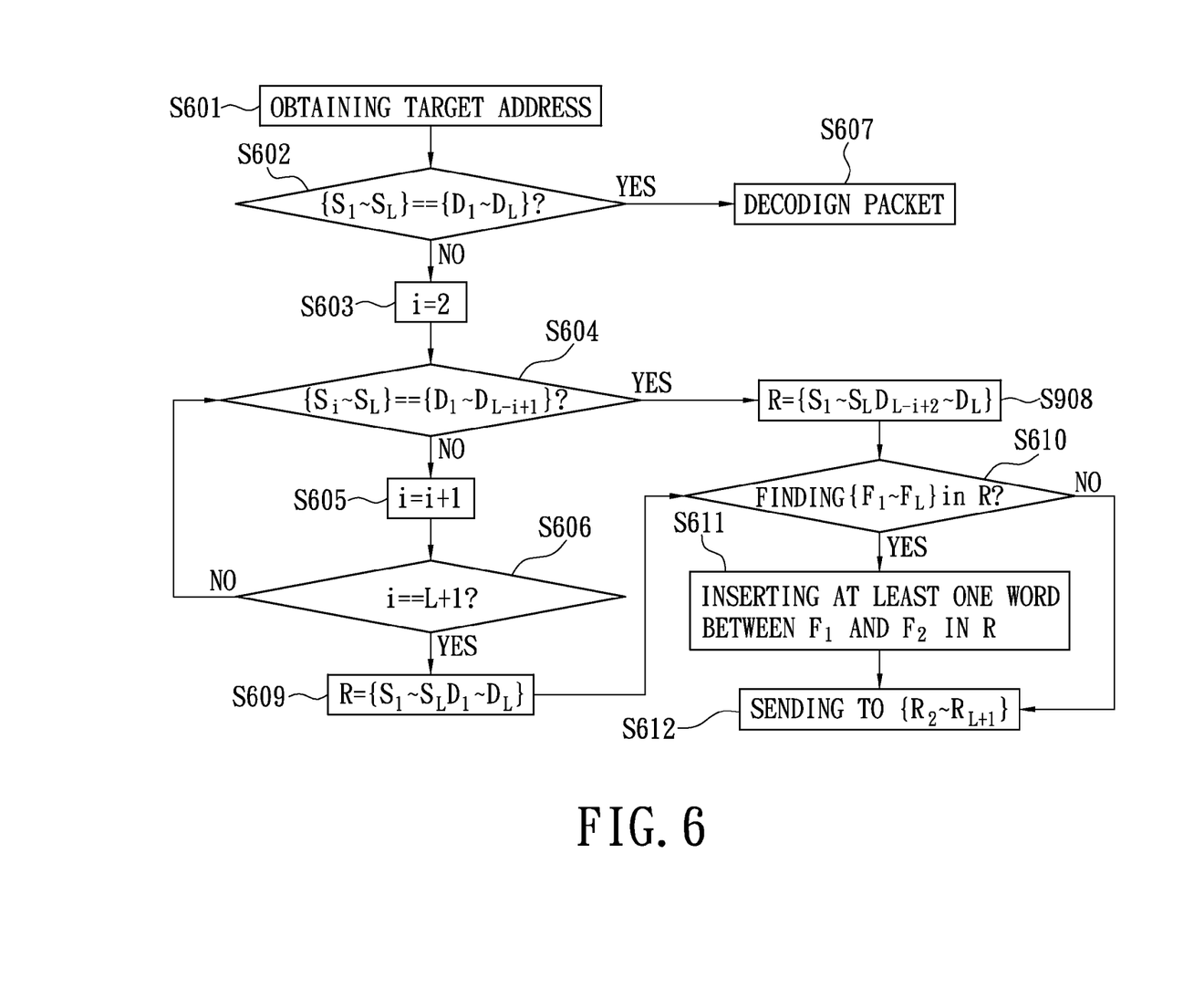
FIG. 6 is a flow chart of a routing method with fault and/or congestion avoidance used in a NoC processor according to an exemplary embodiment of the present disclosure.

Referring to FIG. 6, FIG. 6 is a flow chart of a routing method with fault and/or congestion avoidance used in a NoC processor according to an exemplary embodiment of the present disclosure. The NoC router can deal with the fault and/or congestion to successfully route the packet to the target core with minimum hop count overhead by adding at least one word between the first word and second word of the fault and/or congestion information string in the routing string. The details of the routing method with fault and/or congestion avoidance are illustrated as follows, but it is noted that the present disclosure is not limited thereto.

The steps S601 through S609 and S612 in FIG. 6 are respectively similar to the steps S501 through S510, and thus the redundant description is omitted. At step S610, the NoC router finds whether any one of the fault and/or congestion information string exists in the routing string, wherein the fault and/or congestion information string is expressed as $F=\{F_1 \sim F_L\}$. If the fault and/or congestion information string exists in the routing string, step S611 is executed. If no fault and/or congestion information string exists in the routing string, step S612 is executed. At step S611, the NoC router inserting at least one word between the word $F_1$ and $F_2$ in the routing string to update the routing string.

For example, assuming L=3, D=4 and the fault and/or congestion information string is 121, when the core with the addressing string of 010 receives a packet having the target address with the first three words 212, the firstly generated routing string is 101212. Since the fault and/or congestion information string of 121 exists in the routing string of 101212, the NoC router insert a word of 0 (or 3) between fourth word and fifth word of the routing string, and thus the routing string is updated to be 1010212 (or 1013212 if the word of 3 is inserted). Thus, the packet is then transmitted to the core with the addressing string of 010 (or 013 if the word of 3 is inserted).

[Exemplary Embodiment of Routing Method with Redundancy-Free Multicasting]

Figure 7:
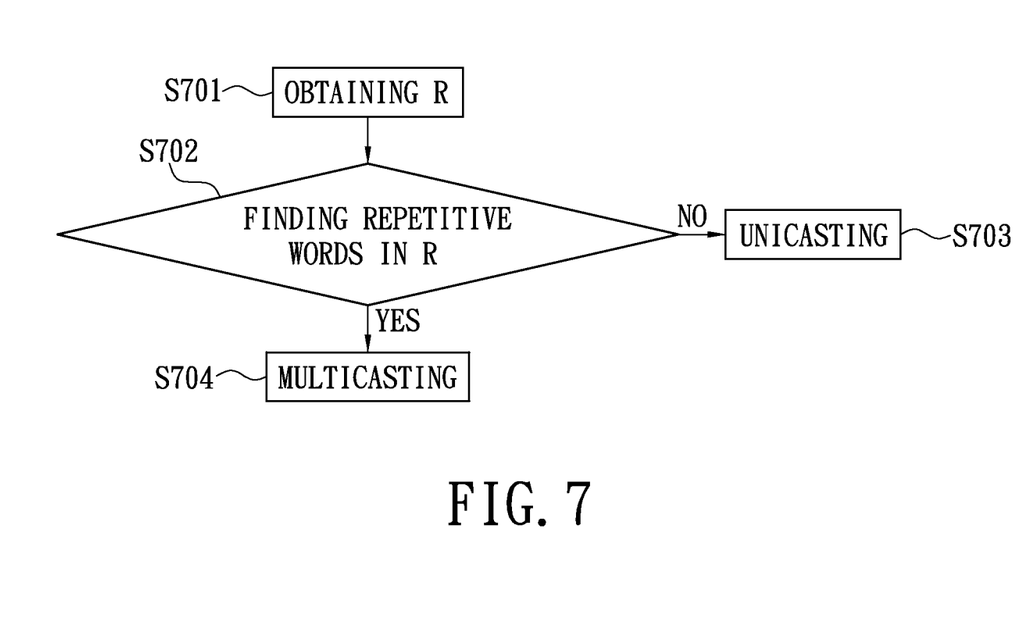
FIG. 7 a flow chart of a routing method with redundancy-free multicasting used in a NoC processor according to an exemplary embodiment of the present disclosure.

Referring to FIG. 7, FIG. 7 a flow chart of a routing method with redundancy-free multicasting used in a NoC processor according to an exemplary embodiment of the present disclosure. The routing method can use the repetitive words to carry out the multicasting, and that is, the invalid addressing string of the next core is used to be present of the multicasting addressing.

When the first L words of the target address of the packet being present of $\{D_1 \sim D_L\}$ have the repetitive words, such as $D_x D_{x+1}$, the packet will be finally multicasting to the cores with the addressing strings which have the same first x words, wherein x is the first repetitive word index being an integer from 1 through L−1. When the NoC router of the core receives a packet, the NoC router generates the routing string according to the first L words of the target address of the packet and the addressing string of the core. When the $L^{th}$ and $(L+1)^{th}$ words of the routing string are not the repetitive words, the NoC router forwards the packet according to the $2^{nd}$ through $(L+1)^{th}$ words of the routing string. When the NoC router of the core finds that the $L^{th}$ and $(L+1)^{th}$ words of the routing string are the repetitive words, the NoC router clones the packet and the routing string to generate cloned packets and cloned routing strings, and modifies the target addresses of the cloned packets and the cloned routing strings. Then the NoC router forwards each of the cloned packets to the next core according to the $2^{nd}$ through $(L+1)^{th}$ words of the corresponding cloned routing string. The details of the routing method with redundancy-free multicasting are illustrated as follows, but it is noted that the present disclosure is not limited thereto.

At step S701, the NoC router obtaining the routing string according to the addressing string of the core and the L words of the target address of the packet. The details of the generation of the routing string are mentioned in FIG. 5 or FIG. 6, and the redundant description is thus omitted.

Then, at step S702, the NoC router finds whether the $L^{th}$ and $(L+1)^{th}$ words of the routing string are the repetitive words. If the $L^{th}$ and $(L+1)^{th}$ words of the routing string are the repetitive words, step S704 is executed. If the $L^{th}$ and $(L+1)^{th}$ words of the routing string are not the repetitive words, step S703 is executed. It is noted that the NoC router can directly check whether the $L^{th}$ and $(L+1)^{th}$ words of the routing string are the same words to determine whether the $L^{th}$ and $(L+1)^{th}$ words of the routing string are the repetitive words; or alternatively, the NoC router obtains the differential value j between the length of the routing string and the addressing string length L, and checks the $(L-j)^{th}$ and $(L-j+1)^{th}$ words of the target address are the same words to determine whether the $L^{th}$ and $(L+1)^{th}$ words of the routing string are the repetitive words.

At step S703, the packet is unicasting to the next core with the addressing string of $\{R_2 \sim R_{L+1}\}$. At step S704, the NoC router clones the packet and routing string to generate cloned packets and cloned routing strings, modifies the target addresses of the cloned packets and the cloned routing strings, and then forwards each of the cloned packets according to the $2^{nd}$ through $(L+1)^{th}$ words of the corresponding cloned routing string.

When the $L^{th}$ and $(L+1)^{th}$ words of the routing string are the repetitive words, the $(L-j)^{th}$ and $(L-j+1)^{th}$ words of the target address are the same words, i.e. $D_{L-j} = D_{L-j+1}$ is true, wherein j is the differential value between the length of the routing string and the addressing string length L. Thus, the NoC router modifies the target address according to the differential value j between the length of the routing string and the addressing string length L. To put it concretely, the NoC router modifies the first L words $\{D_1 \sim D_L\}$ of the target addresses of the cloned packet to be $\{D_1 \sim D_{L-j} Z_{1,1} \sim Z_{1,j}\}$, $\{D_1 \sim D_{L-j} Z_{2,1} \sim Z_{2,j}\}$, . . . , and $\{D_1 \sim D_{L-j} Z_{D-1,1} \sim Z_{D-1,j}\}$, wherein the words $Z_{x,1} \sim Z_{x,j}$ are the same word, the words $Z_{1,1} \sim Z_{D-1,1}$ are different from each other, and x is an integer from 1 through D-1. The NoC router further modifies the $(L+1)^{th}$ words of cloned routing strings respectively to be $Z_{1,1} \sim Z_{D-1,1}$.

For example, assuming L=4, D=4, when a packet with the first four words of 33XX in the target address is transmitted to the core with the addressing string of 0123. The routing string generated by the core with the addressing string of 203 is 01233XX. Since the differential value j between the length of the routing string and the addressing string length L is 3, and the $4^{th}$ and $5^{th}$ words of the routing string are the repetitive words (i.e. the $1^{st}$ and $2^{nd}$ words of the target address are the same words, and $D_1 = D_2$ is true), thus the NoC router of the core with the addressing string of 0123 clones the packet and the routing string, and modifies the first 4 words of target addresses of the cloned packets to be 3111, 3222, and 3222, and modifies the cloned routing strings to be 01231XX, 01232XX, and 01230XX. Thus, the NoC router of the core with the addressing string of 0123 forwards respectively three cloned packets with the first 4 words of target addresses of 3111, 3222, and 3200 to the cores with addressing string of 1231, 1232, and 1230.

The target address of the packet received by the core with the addressing string of 1231 has the first 4 words of 3111, and thus the core with the addressing string generates the routing string of 123111. Since the differential value j between the length of the routing string and the addressing string length L is 2, the $4^{th}$ and $5^{th}$ words of the routing string are the repetitive words (i.e. the $2^{nd}$ and $3^{rd}$ words of the target address are the same words, and $D_2 = D_3$ is true), thus the NoC router of the core with the addressing string of 1231 clones the packet and the routing string, and modifies the first 4 words of target addresses of the cloned packets to be 3100, 3122, and 3133, and modifies the cloned routing strings to be 123100, 123122, and 123133. Thus, the NoC router of the core with the addressing string of 1231 forwards respectively three cloned packets with the first 4 words of target addresses of 3100, 3122, and 3133 to the cores with addressing string of 2310, 2312, and 2313.

The target address of the packet received by the core with the addressing string of 2310 has the first 4 words of 3100, and thus the core with the addressing string generates the routing string of 123100. Since the differential value j between the length of the routing string and the addressing string length L is 1, the $4^{th}$ and $5^{th}$ words of the routing string are the repetitive words (i.e. the $3^{rd}$ and $4^{th}$ words of the target address are the same words, and $D_3 = D_4$ is true), thus the NoC router of the core with the addressing string of 2310 clones the packet and the routing string, and modifies the first 4 words of target addresses of the cloned packets to be 3101, 3102, and 3103, and modifies the cloned routing strings to be 23101, 23102, and 23103. Thus, the NoC router of the core with the addressing string of 2310 forwards respectively three cloned packets with the first 4 words of target addresses of 3101, 3102, and 3133 to the cores with addressing string of 3101, 3102, and 3103.

In the similar manner, the packet with the first 4 words of 33XX in the target address is finally routed to the cores with the addressing string of 3101, 3102, 3103, 3121, 3123, 3120, 3130, 3131, 3132, 3201, 3202, 3203, 3211, 3213, 3210, 3230, 3231, 3232, 3010, 3012, 3013, 3020, 3021, 3023, 3031, 3032, and 3030.

When the conventional processor perform an array operation in a pull-based processing, the data (including data of zero) is first placed in the system bus instruction fetch memory, and then pulled out by the multiple cores. However, the multicasting is useful in the NoC processor since one core can pass data and instructions as multicasting packets to the other cores through the Kautz NoC. This scheme is named push-based processing. Compared to the conventional processor, the NoC processor has lower power consumption and higher performance.

[Possible Results of Exemplary Embodiment]

To sum up, a NoC processor with multiple cores and a routing method thereof are provided. The NoC processor is a brain-like architecture, the minimum hop count of the packet is 1, and the maximum hop count of the packet is less than or equal to L by using the routing method in the NoC processor while no congestion and fault exists. Thus, the NoC processor has high performance, high power efficiency, and wide range of supported application.

It is noted that the core of the NoC processor in one exemplary embodiment is event-triggered to enhance the power efficiency. In another one exemplary embodiment, the NoC processor can deal with the problem of the fault and/or congestion. In other one exemplary embodiment, the NoC processor can support multicasting to achieve push-based processing, thus increasing power efficiency and the performance.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A NoC processor comprising:
multiple cores, each of the cores is assigned with an addressing string with L based-D words, and the addressing string does not have two neighboring identical words, wherein L present of an addressing string length is an integer larger than 1, D present of a word selection is an integer larger than 2; and a Kautz NoC, wherein each of the cores is unidirectionally link to other (D−1) cores through the Kautz NoC, and in the two connected cores, the last (L−1) words associated with the addressing string of one core are same as the first (L−1) words associated with the addressing string of the other core.

2. The NoC processor according to claim 1, further comprising:

two system bus instruction fetch memories, one of system bus instruction fetch memories is shared by the cores of a first group, and the other one of system bus instruction fetch memories is shared by the cores of second first group.

3. The NoC processor according to claim 1, wherein a minimum hop count of a packet is 1, and the maximum hop count of the packet is less than or equal to L while no congestion and fault exists.

4. The NoC processor according to claim 1, wherein the cores are event-triggered, and each component of the core is power on merely when the packet arrives to the component.

5. The NoC processor according to claim 1, wherein each of the cores comprises:

a NoC router, used to determine whether to decode the received or to transmit the packet to at least one of the other connected cores according to a target address in the received packet; and a core unit, used to process the decoded packet;

wherein the NoC router encodes the processed packet to form a new packet, and transmit the new packet to at least one of the other connected cores.

6. The NoC processor according to claim 1, wherein the Kautz NoC comprises multiple connection lines, and the connection lines are layout on different layers of the Kautz NoC.

7. The NoC processor according to claim 5, wherein the cores unit are processing IP.

8. The NoC processor according to claim 5, wherein the core unit performs a hybrid MIMD execution, and the hybrid MIMD execution comprises at least one SISD execution and/or at least one SIMD execution.

9. The NoC processor according to claim 5, wherein the NoC router comprises:

a packet encoder, used to encode the processed packet;

a packet decoder, used to decode the received packet; and a Kautz NoC router, used to determine whether to decode the received or to transmit the packet to at least one of the other connected cores according to the target address in the received packet.

10. The NoC processor according to claim 9, wherein the Kautz NoC router generates a routing string according to the addressing string of the core and first L words of the target address, and transmits the packet to the next core with the addressing string of the second through (L+1)th words in the routing string.

11. The NoC processor according to claim 10, wherein the Kautz NoC router records at least one fault and/or congestion information string to prevent the packet from routing to the fault or congested core, and thus the packet is routed to the target core with a minimum hop count overhead.

12. The NoC processor according to claim 11, wherein when the Kautz NoC router finds that the fault and/or congestion information string exists in the routing string, the Kautz NoC router inserts at least one word between the first word and second word of the fault and/or congestion information string in the routing string to update the routing string.

13. The NoC processor according to claim 10, wherein Kautz NoC router supports multicasting by using repetitive words in the target address of the packet.

14. The NoC processor according to claim 13, wherein the core passes data and instructions as multicasting packets to the other connected cores.

15. The NoC processor according to claim 13, wherein when the Kautz NoC router the Lth and (L+1)th words of the routing string are the repetitive words, the Kautz NoC router clones the packet and the routing string to generate cloned packets and cloned routing strings, modifies target addresses of the cloned packets and the cloned routing strings, then transmits each of the cloned packets to the other connected core according to the 2nd through (L+1)th words of the corresponding cloned routing string.

16. The NoC processor according to claim 1, wherein a packet routed between the cores comprises a control flag, a target address, an instruction, and data, and the control flag is present of a priority of the packet.

17. The NoC processor according to claim 1, wherein the Kautz NoC is implemented by a FPGA or ASIC through a hardware code.

18. A routing method, used in the NoC processor according to claim 1, wherein the routing method comprises:

sequentially left-shifting the addressing string of the core to find whether first n words of the left-shifted addressing string is equal to first n words of a target address in a packet, wherein n is an integer larger than or equal to 1, and the addressing string of the core and the first n words of the target address are respectively present of $\{S1{\sim}SL\}$ and $\{D1{\sim}DL\}$;

if the first n words of the left-shifted addressing string is equal to the first n words of the target address, generating a routing string $R=\{R1{\sim}RK\}=\{S1{\sim}SLDn+1{\sim}DL\}$;

if the first n words of the left-shifted addressing string is not equal to the first n words of the target address, generating the routing string $R=\{R1{\sim}RK\}=\{S1{\sim}SLD1{\sim}DL\}$; and transmitting the packet to the next core with the addressing string present of $\{R2{\sim}RL+1\}$.

19. The routing method according to claim 18, further comprising:

determining whether a fault and/or congestion information string exists in the routing string;

when the fault and/or congestion information string exists in the routing string, inserting at least one word between the first word and second word of the fault and/or congestion information string in the routing string to update the routing string.

20. The routing method according to claim 18, further comprising:

finding whether the Lth and (L+1)th words of the routing string are the repetitive words;

if the Lth and (L+1)th words of the routing string are the repetitive words, cloning the packet and the routing string to generate cloned packets and cloned routing strings;

modifying target addresses of the cloned packets and the cloned routing strings; and transmitting each of the cloned packets to the other connected core according to the 2nd through (L+1)th words of the corresponding cloned routing string.

21. The routing method according to claim 20, wherein a differential value between the length of the routing string and the addressing string length is obtained, and whether the (L−j)th and (L−j+1)th words of the target address are the same words is checked to determine whether the Lth and (L+1)th words of the routing string are the repetitive words.

22. The routing method according to claim 20, wherein the target address is modified according to a differential value between the length of the routing string and the addressing string length.

23. The routing method according to claim 22, wherein the first L words present of $\{D1\sim DL\}$ associated with the target addresses of the cloned packet are modified to be $\{D1\sim DL-jZ1,1\sim Z1,j\}$, $\{D1\sim DL-jZ2,1\sim Z2,j\}$, . . . , and $\{D1\sim DL-jZD-1,1\sim ZD-1,j\}$, wherein the words $Zx,1\sim Zx,j$ are the same word, the words $Z1,1\sim ZD-1,1$ are different from each other, and x is an integer from 1 through D−1; and the (L+1)th words of cloned routing strings are modified to be $Z1,1\sim ZD-1,1$ respectively.

* * * * *